May 15, 1951
R. H. SPRICK
2,553,119
BRAKE SET CONTROL
Filed Oct. 19, 1948
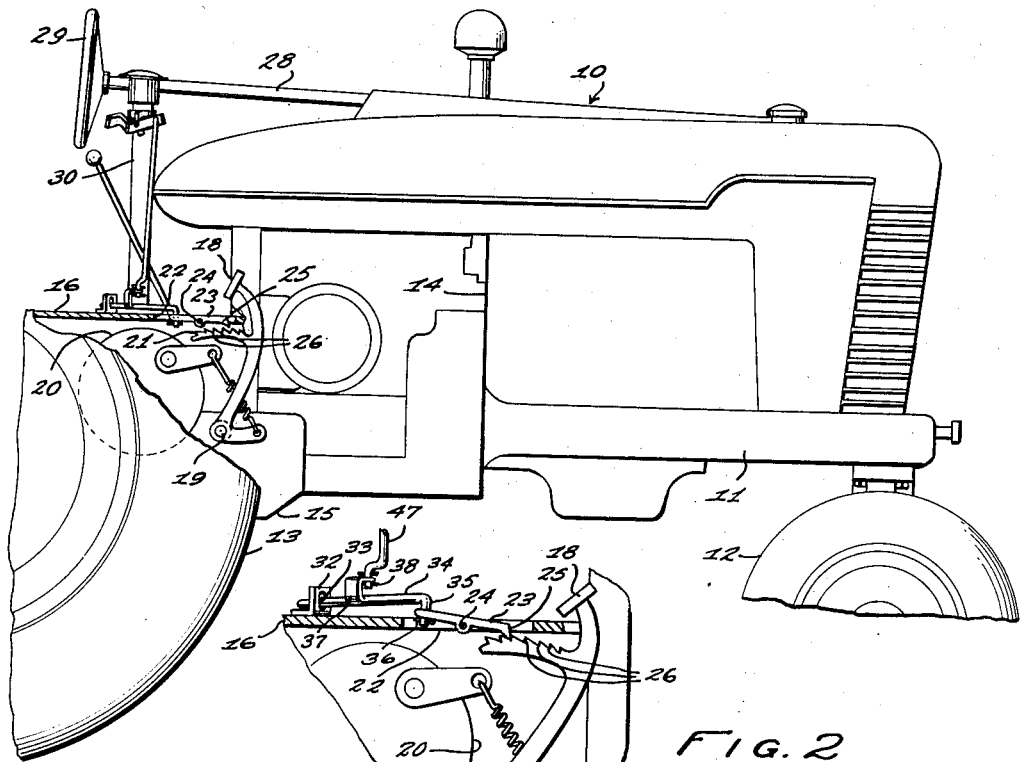
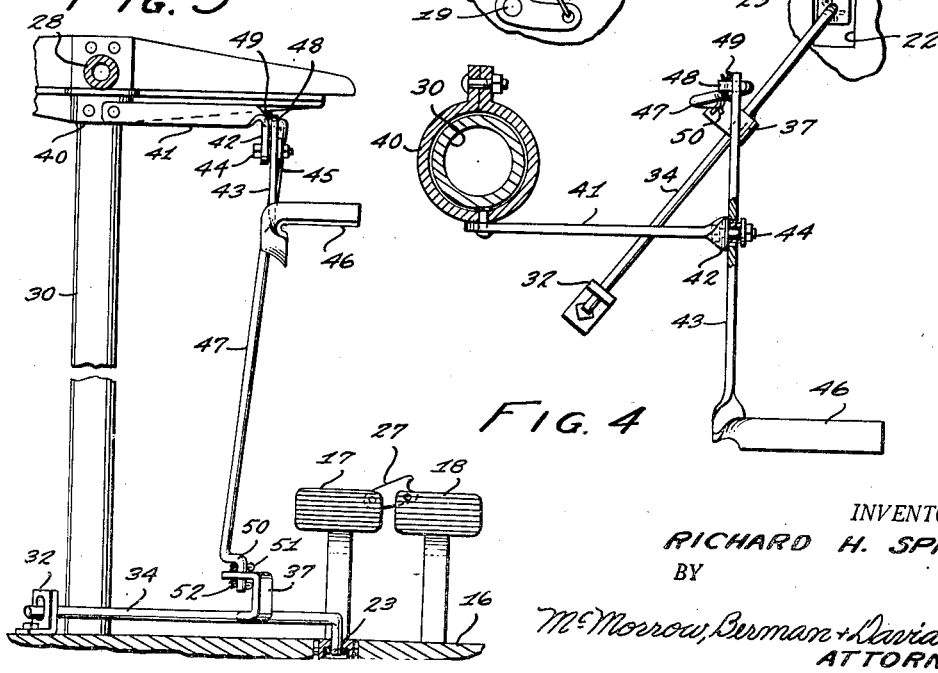
INVENTOR.
RICHARD H. SPRICK
BY
McMorrow, Berman + Davidson
ATTORNEYS Patented May 15, 1951

2,553,119

UNITED STATES PATENT OFFICE 2,553,119

BRAKE SET CONTROL

Richard H. Sprick, Lake City, Minn.

Application October 19, 1948, Serial No. 55,413

2 Claims. (Cl. 74—540)

This invention relates to brake set controls and more particularly to an improved brake set control for a tractor brake.

It is among the objects of the invention to provide an improved tractor brake set control by means of which the tractor brakes can be set or latched in "on" position with a minimum of manual effort on the part of the tractor operator and without the necessity of the operator bending or contorting his body in order to set or release the brakes, which control mechanism can be quickly and easily applied to various types and makes of tractors without any material modification of the tractor structure, is fully effective for manual setting and release of the brakes, places a brake set control handle in easy and convenient reach of the hands of the tractor operator, and does not interfere in any way with normal operation of the tractor, and which is simple and durable in construction, and extremely economical to manufacture.

Other objects and advantages will become apparent from a consideration of the following description and the appended claims in conjunction with the accompanying drawing wherein:

Figure 1 is a side elevation of a fragmentary portion of a conventional tractor showing a brake set control mechanism illustrative of the invention operatively applied thereto, a portion of the tractor being broken away and shown in cross-section to better illustrate the brake mechanism and the application of the improved control;

Figure 2 is a view of a fragmentary portion of the tractor and brake setting control similar to Figure 1 but showing the parts in a different operative position from that illustrated in Figure 1;

Figure 3 is a rear elevation on a somewhat enlarged scale of a fragmentary portion of a tractor showing the application thereto of a brake setting control illustrative of the invention; and Figure 4 is a top plan view of the brake setting control mechanism.

With continued reference to the drawing the tractor, generally indicated at 10, is of conventional construction and includes a frame 11 supported on front wheels 12 and rear wheels 13 and carrying an engine 14 and a transmission mechanism 15. A generally horizontal platform 16 is mounted on the top of the transmission mechanism and a pair of brake pedals 17 and 18 are disposed adjacent the front end of the platform 16 and pivotally mounted at their lower ends on the housing of the differential mechanism of the tractor, as indicated at 19. Each brake pedal is operatively connected to a rear wheel brake, as indicated at 20, disposed one at each side of the differential mechanism of the tractor, so that the brakes can be utilized in steering the tractor if desired.

The brake foot pedal 18 is provided with an arm 21 extending therefrom beneath the platform 16 and the platform is provided immediately above the arm 21 with an elongated slot or aperture 22. A latch 23 is disposed in the slot 22 and pivotally secured to the platform 16 by a pivot pin 24 extending transversely of the latch and secured at its ends to the platform at each side of the slot. The latch 23 extends to each side of the pin 24 and is provided on its front end with a dog 25 engageable with the teeth 26 provided on the upper side of arm 21 so that when the rear end of the latch is pulled upwardly the dog engages with one of the teeth 26 to hold the pedal 18 in brake applying position. The latch 23 terminates somewhat short of the rear end of the slot 22 so that the operator of the tractor can insert a finger under the rear end of the latch and tilt it to tooth engaging position. This operation requires that the operator first push the pedal down with his foot and, while holding the pedal down with his foot in brake applying position, reach down from the tractor seat and tip the latch 23 to engage the dog 25 with one of the teeth 26 and hold the brake pedal depressed. This requires a degree of dexterity and a contortional ability of which many tractor operators are not capable and is fatiguing if it is necessary to set the tractor brake at frequent intervals.

The brake pedal 18 carrying the arm 21 is usually the right hand pedal and the left hand pedal 17 carries a pivoted tongue 27 which may be moved into engagement in a tongue receiving slot in the top of the right hand pedal 18, as illustrated in Figure 3, to interconnect both of the brake pedals so that both of the tractor brakes can be set at the same time.

The tractor also includes a steering shaft 28 carrying a steering wheel 29 on its rearward end and supported adjacent the steering wheel by a column 30 extending upwardly from the forward portion of the platform 16.

The steering wheel 29 is positioned directly in front of an operator sitting on the tractor seat and the column 30 is also disposed directly in front of the operator and extends upwardly to a height within easy reach of the tractor operator.

The tractor construction so far described is old and well known and constitutes no part of the present invention except in the combination of the improved control mechanism with the pertinent parts of the tractor.

In applying the improved control mechanism to the tractor the only changes necessary to the tractor construction are the provision of a hole or aperture near the rear end of the latch 23 and the attachment of an angle bracket 32 to the tractor platform at a location spaced from the latch 23 toward the opposite side of the platform. The angle bracket 32 is secured to the platform by welding or by means of a bolt or other suitable means and is provided in its upstanding leg with an elongated aperture 33. A rod 34 has one end portion received in the aperture 33 of the angle bracket 32 and has near its opposite end an angularly disposed portion 35 which is inserted through the opening provided in the latch 23 near the rear end of the latter and a suitable pin or cotter key 36 is inserted through a transverse aperture in the rod 34 below the latch 23 to keep the end portion 35 of the rod from pulling out of the latch.

A flat, somewhat C-shaped clip 37, is secured to the rod 34 near the midlength location of the rod and provides above the rod a lug 38 provided with a substantially central aperture for a purpose presently to be described.

A circular clamp 40 is secured around the column 30 near the upper end of the latter and an arm 41 is secured at one end to this clamp and extends laterally from the column 30 toward the side of the platform near which the brake pedals are disposed. Near its outer end the arm 41 is bent to provide a perpendicularly extending portion and which portion is provided with an aperture to constitute an apertured suppporting ear 42 and a lever 43 is pivotally mounted on the ear 42 by suitable means such as the pivot bolt 44. The bolt passes through the ear and through an aperture provided in the flat lever 43 intermediate the ends of the lever and also passes through a reinforcing boss 45 secured on one side of the lever surrounding the bolt receiving aperture. The lever 43 extends from the ear 42 toward the tractor operator and is provided on its end nearest the operator with a handle 46 which extends outwardly from the lever substantially at right angles to the latter. The opposite end of the lever is provided with an aperture and a link 47 is pivotally connected to this distal end of the lever by means of a perpendicularly extending end portion 48 of the link received in the aperture of the lever. A conventional cotter key or other suitable device 49 extending through a transverse aperture in the angularly disposed upper end portion of a link prevents separation of the link and the lever and at its lower end the lever 47 is provided with an off-set end portion 50 which is inserted through the aperture in the lug provided by clip 37.

Cotter keys or other suitable devices 51 and 52 are inserted through transverse apertures in the off-set lower end portion of the link, one above and one below the lug of the clip 37, to maintain the lower end of the link against separation from the clip and provide an operative connection between the lever 43 and the rod 34.

With the improved control mounted on the tractor, as described above, when either the right hand foot pedal 18 is depressed or both of the foot pedals are depressed, the handle 46 may be forced downward manually by the tractor operator causing the distal end of the lever 43 to raise the link 47 thereby raising the end of rod 34 connected to the rear end of latch 23; the opposite end of the rod being held against movement by bracket 32, thereby bringing the dog 25 of the latch into engagement with a tooth 26 on the brake pedal arm 21 and setting the brake against release until the latch is moved to withdraw the dog from the dog-engaged tooth of the foot pedal arm. When it is desired to release the brake the handle 46 may be raised or the rear end of the latch may be depressed by the heel of the operator to permit the brake pedal or pedals to return to brake releasing position.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What I claim:

1. In a tractor having a platform, a brake setting latch pivotally mounted in said platform, and a steering wheel supporting column disposed above said platform, brake set control means comprising an apertured bracket secured to the tractor platform at a location spaced from the brake setting latch, a rod having one end engaged in said bracket and its opposite end engaged with the tractor brake latch, a clamp secured on the steering column, a lever pivotally supported intermediate its length by said clamp and having a handle on one end, and a link connected at its lower end to said rod intermediate the ends of the latter and connected at its upper end to the end of said lever opposite said handle.

2. In a tractor having a platform, a brake setting latch pivotally mounted in said platform and a steering wheel supporting column disposed above said platform, brake set control means comprising an apertured bracket secured to the tractor platform at a location spaced from the brake setting latch, a rod having one end engaged in said bracket and its opposite end engaged with the tractor brake latch, a clamp secured on the steering column, a lever pivotally supported intermediate its length by said clamp and having a handle on one end, and a link connected at its lower end to said rod intermediate the ends of the latter and connected at its upper end to the end of said lever opposite said handle, said rod having an angularly disposed portion at one end insertable into an aperture in the brake setting latch, and said handle being disposed substantially perpendicular to said lever.

RICHARD H. SPRICK.

REFERENCES CITED

The following references are of record in the file of this patent:

UNITED STATES PATENTS

| Number | Name | Date |
|---|---|---|
| 251,672 | Barker | Dec. 27, 1881 |
| 322,585 | Daudelin | July 21, 1885 |
| 691,724 | Mason | Jan. 21, 1902 |
| 905,135 | Balloco | Dec. 1, 1908 |
| 948,246 | Page | Feb. 1, 1910 |
| 1,218,028 | William | Mar. 6, 1917 |
| 1,418,619 | Cain | June 6, 1922 |
| 1,507,873 | Wandersee | Sept. 9, 1924 |
| 2,108,666 | Hall | Feb. 15, 1938 |
| 2,202,585 | Jordan | May 28, 1940 |